United States Patent [19]

Matsumoto et al.

[11] Patent Number: 5,800,797
[45] Date of Patent: Sep. 1, 1998

[54] PROCESS FOR PRODUCING ALUMINA AND APPARATUS THEREFOR

[75] Inventors: Hiroshi Matsumoto; Hiroki Arao; Morio Fukuda, all of Kitakyushu, Japan

[73] Assignee: Catalysts & Chemicals Industries Co., Ltd., Tokyo, Japan

[21] Appl. No.: 652,586

[22] PCT Filed: Dec. 8, 1994

[86] PCT No.: PCT/JP94/02065

§ 371 Date: Jun. 7, 1996

§ 102(e) Date: Jun. 7, 1996

[87] PCT Pub. No.: WO95/15920

PCT Pub. Date: Jun. 15, 1995

[30] Foreign Application Priority Data

Dec. 9, 1993 [JP] Japan ................... 5-340863

[51] Int. Cl.⁶ ................. C01F 7/02; B01J 8/00
[52] U.S. Cl. ................. 423/625; 422/225; 422/234; 423/626; 423/628
[58] Field of Search ................. 423/625, 628, 423/626; 422/225, 234

[56] References Cited

U.S. PATENT DOCUMENTS

| | | | |
|---|---|---|---|
| 2,907,634 | 10/1959 | Ziese et al. | 423/626 |
| 3,028,227 | 4/1962 | Ballestra | 422/234 |
| 3,086,845 | 4/1963 | Malley et al. | 423/626 |
| 3,681,013 | 8/1972 | Fish | 423/625 |
| 3,833,718 | 9/1974 | Reed et al. | 423/625 |
| 3,987,155 | 10/1976 | Ziegenhain | 423/628 |
| 4,248,852 | 2/1981 | Wakabayashi et al. | |
| 4,555,394 | 11/1985 | Asaoka et al. | 423/628 |
| 4,562,059 | 12/1985 | Asaoka et al. | 423/628 |
| 4,902,666 | 2/1990 | Rainis | 423/625 |
| 5,055,284 | 10/1991 | Andrews et al. | 423/628 |
| 5,314,506 | 5/1994 | Midler, Jr. et al. | 423/659 |

FOREIGN PATENT DOCUMENTS

| | | | |
|---|---|---|---|
| 2302724 | 8/1973 | Germany | 423/628 |
| 53-19000 | 6/1978 | Japan . | |
| 58190823 | 4/1982 | Japan . | |
| 60-50721 | 11/1985 | Japan . | |
| 37417 | 2/1989 | Japan | 423/628 |
| 169511 | 3/1989 | Japan . | |
| 132169 | 6/1989 | Japan . | |
| 21767 | 1/1990 | Japan . | |
| 339976 | 6/1991 | Japan . | |
| 5325 | 1/1993 | Japan . | |
| 825414 | 12/1959 | United Kingdom | 423/628 |
| 888772 | 2/1962 | United Kingdom | 423/628 |

*Primary Examiner*—Wayne Langel
*Attorney, Agent, or Firm*—Webb Ziesenheim Bruening Logsdon Orkin & Hanson, P.C.

[57] ABSTRACT

In the present invention, alumina is produced by a process comprising leading a starting aqueous slurry containing a seed alumina hydrate to a circulating system, the aqueous slurry being circulated and returned to the starting aqueous slurry, wherein an aqueous solution of an aluminum salt and an aqueous solution of a neutralizer are added to the aqueous slurry being circulated and mixed together at a pH value of 6 to 11 to thereby cause the aqueous slurry to contain formed alumina hydrate prior to the return to the starting aqueous slurry. The production of alumina is performed in an apparatus comprising a vessel equipped with an agitator for accommodating an aqueous slurry therein and a circulating device capable of leading the aqueous slurry outside the vessel and causing the aqueous slurry to circulate and return into the vessel, the above circulating device being provided at its aqueous slurry flowback zone with a first liquid addition device adapted to add an aqueous solution of an aluminum salt to the aqueous slurry being circulated and with a second liquid addition device adapted to add an aqueous solution of a neutralizer to the aqueous slurry being circulated, which apparatus further comprises a mixer adapted to mix together the aqueous slurry being circulated, the aqueous solution of the aluminum salt and the aqueous solution of the neutralizer.

10 Claims, 3 Drawing Sheets

PROCESS FOR PRODUCING ALUMINA AND APPARATUS THEREFOR

TECHNICAL FIELD

The present invention relates to a process for producing alumina. More particularly, it is concerned with a process for producing a porous alumina having its pore volume, size and surface area controlled so that the porous alumina can suitably be used as, for example, a catalyst support or an adsorbent.

BACKGROUND ART

A porous alumina now finds wide industrial application as, for example, a catalyst support or an adsorbent. The requisite ranges of a pore volume, size and a surface area of a porous alumina vary depending on the intended use of the porous alumina. Thus, control of the pore distribution in such aspects is inevitable. With respect to a molding of the porous alumina, being excellent in mechanical strength and other properties is required.

Methods in which aging or other treatment is effected of an alumina hydrate obtained by, for example, a neutralization reaction and methods in which alumina hydrate precipitation conditions are controlled have been proposed as methods suitable for achieving control of the pore distributions, e.g., the pore volume and pore size distributions of the porous alumina.

An example of the former methods is described in Japanese Patent Publication No. 53(1978)-19000 in which, for example, an amorphous alumina hydrate is heated at 50° C. or above under agitation in weakly alkali conditions (pH 8 to 12) to thereby carry out aging thereof, so that a pseudo-boehmite alumina particle size is grown with the result that, in an alumina product, the volume of pores each having a size of smaller than 600 Å is larger than 0.6 ml/g.

Examples of the latter methods are described in Japanese Patent Publication No. 57(1982)-44605 and Japanese Patent Laid-open Publication No. 58(1983)-190823.

Illustratively, Japanese Patent Publication No. 57(1982)-44605 describes a method comprising adding an aluminum salt to a slurry containing aluminum hydroxide which has its pH value adjusted to 6–10 and is held at 50° C. or higher temperatures to thereby cause the slurry to have a pH value of not greater than 5 or at least 11, adding a neutralizer to return the pH value to 6–10 and repeating these a plurality of times, so that the pore distribution, e.g., the pore volume distribution of the alumina product is controlled.

Japanese Patent Laid-open Publication No. 58(1983)-190823 discloses a process for producing an alumina support which comprises a step of adding to a slurry containing aluminum hydroxide an aluminum salt at a rate of 20 to 500%/hr, provided that the amount of the aluminum hydroxide contained in the slurry is regarded as being 100% in terms of molar ratio of aluminum, together with a pH controller while maintaining a hydrogen icon concentration and temperature of the slurry at 6 to 11 in pH and 50° C. or higher, respectively, to thereby form an alumina gel and a step of converting the alumina gel to alumina. At least one of the above aluminum salt and the pH controller substantially contains sulfate ions.

In any of the conventional processes for producing a porous alumina as described in, for example, the above Japanese Patent Publication No. 57(1982)-44605 and Japanese Patent Laid-open Publication No. 58(1983)-190823, an aluminum salt and a neutralizer are in sequence or simultaneously added to a slurry containing aluminum hydroxide (corresponding to a seed alumina hydrate) to thereby effect reaction, so that the desired porous alumina is batchwise obtained.

However, the production of the porous alumina according to the above processes has been accompanied by an undesirable phenomenon that not only does precipitation of alumina hydrate occur in the slurry containing a large quantity of alumina hydrate to thereby render the state of mixing of alumina hydrate ununiform but also fine particles of alumina hydrate are newly formed with the result that the finally obtained alumina hydrate particles would have a size distribution to thereby disenable satisfactory control of the pore distribution of tie porous alumina.

Further, the conventional control of a pore volume of an alumina product by aging or otherwise treating alumina hydrate enables enlarging the pore volume of the resultant alumina but has encountered the problem that, when a molding is made by using the alumina, the mechanical strength of the molding is poor.

Still further, the control of the pore distributions, such as a pore volume and a pore size distributions, of the alumina product by changing the conditions for alumina hydrate precipitation has encountered not only a problem that the pore distributions can be controlled only in very small ranges but also a problem that alumina product manufacturing conditions and alumina product manufacturing operations are so complex that it is difficult to stably produce alumina product with uniform properties and further the resultant alumina product has poor quality. Therefore, the above method of controlling the pore distribution of the alumina product by changing the conditions for alumina hydrate precipitation is still not a satisfactory industrial process.

The inventors have made extensive and intensive studies with a view toward resolving the above problems of the prior art. As a result, it has been found that, when an aqueous solution of an aluminum salt and an aqueous solution of a neutralizer are mixed with a water-base slurry containing a seed alumina hydrate while circulating the aqueous slurry and a pH value of the mixed slurry is controlled to 6–11, the generation of new seed alumina hydrate in the mixed slurry is inhibited and this seed alumina hydrate attains uniform particulate growth, thereby enabling arbitrary control of the pore distributions, such as the pore volume and pore size distributions, of the formed alumina particles. The present invention has been completed on the basis of the above finding.

OBJECT OF THE INVENTION

The present invention has been made for resolving the above problems of the prior art. Thus, it is an object of the present invention to provide a process for producing a porous alumina, which enables controlling in wide ranges the pore distributions such as pore volume and pore size distributions thereof, which ensures high productivity although the manufacturing operations are simple and which can form moldings of high mechanical strength, and to provide an apparatus suitably employed in the above process.

It is another object of the present invention to provide a process for producing a catalyst support, especially, a support of alumina which is excellent as a hydrogenation (hydrotreating) catalyst support.

It is a further object of the present invention to provide a process for producing a porous alumina containing at least one element selected from the elements of Groups IIA, IIIA, IVA, VA, VIA, VIII, IIIB (excluding Al) and IVB of the periodic table.

DISCLOSURE OF THE INVENTION

A process for producing alumina according to the present invention comprises leading outside a starting aqueous slurry containing a seed alumina hydrate, an outside led part of the aqueous slurry being circulated and returned to said starting aqueous slurry, wherein an aqueous solution of an aluminum salt and an aqueous solution of a neutralizer are added to the aqueous slurry being circulated and mixed together at a pH value of 6 to 11 to thereby cause the aqueous slurry to contain newly obtained alumina hydrate prior to the return to the starting aqueous slurry.

An apparatus for producing alumina according to the present invention comprises a vessel equipped with an agitator for accommodating an aqueous slurry therein and a circulating device capable of leading the aqueous slurry outside the vessel and causing the aqueous slurry to circulate and return into the vessel, said circulating device being provided at its aqueous slurry flowback zone with a first liquid addition device adapted to add an aqueous solution of an aluminum salt to the aqueous slurry being circulated and with a second liquid addition device adapted to add an aqueous solution of a neutralizer to the aqueous slurry being circulated, and further comprises a mixer adapted to mix together the aqueous slurry being circulated, the aqueous solution of the aluminum salt and the aqueous solution of the neutralizer.

BRIEF DESCRIPTION OF THE DRAWINGS

FIG. 3 shows the results of the desulfurization activity test performed in Example 4. Reference numerals are assigned to the following structures: 1: tank, 2: agitator 3: pump, 4: circulation line, 5: separator, 6: mixer, 7: pump, 8: line, 9: pump, 10: line, 11: storage tank for an aqueous solution of aluminum salt, 12: storage tank for an aqueous solution of neutralizer, 13: pH meter, 14: temperature controller, 15: steam feed port, and 16: drain outlet.

BEST MODE FOR CARRYING OUT THE INVENTION (a) Process for producing alumina

In a process for producing alumina according to the present invention, an aqueous slurry containing a seed alumina hydrate is led outside, namely, withdrawn outside from a vessel accommodating an aqueous slurry containing a seed alumina hydrate therein and circulated through a circulation line provided outside the vessel.

The seed alumina hydrate contained in the aqueous slurry may be any of various alumina hydrates prepared by conventional methods, which includes, for example, gibbsite, bialite, norstrandite, boehmite, boehmite gel and amorphous alumina gel. Of these, boehmite gel is especially preferred. This boehmite gel is also known as pseudoboehmite. It is obtained by conventional methods, for example, by reacting an aqueous solution of an aluminum salt such as aluminum sulfate with an aqueous solution of a neutralizer such as sodium aluminate at a pH value of 6 to 11. It generally contains fine alumina particles of 1 to 10 nm in diameter.

In the process for producing alumina according to the present invention, use is made of the aqueous slurry which contains the above seed alumina hydrate in the form of being suspended in water in a concentration of generally 1 to 50% by weight and preferably 5 to 20% by weight in terms of $Al_2O_3$.

In the process for producing alumina according to the present invention, an aqueous solution of an aluminum salt is added to the aqueous slurry while it is being circulated.

The aluminum salt employed in the present invention is not particularly limited as long as it is a water-soluble salt. For example, use is made of aluminum sulfate, aluminum nitrate, aluminum chloride and aluminum acetate. Use is also made of basic aluminum salts, such as basic aluminum sulfate, basic aluminum nitrate, basic aluminum chloride, basic aluminum acetate, sodium aluminate and potassium aluminate.

In the present invention, it is preferred to employ an aqueous solution containing the above aluminum salt dissolved in a concentration of 0.5 to 20% by weight and especially 2 to 10% by weight in terms of $Al_2O_3$.

In the process for producing alumina according to the present invention, the aqueous solution of the aluminum salt and an aqueous solution of a neutralizer are introduced in the aqueous slurry containing a seed alumina hydrate while it is being circulated. The term "neutralizer" used herein means a water-soluble substance having the property of reacting with the aluminum salt to thereby form alumina hydrate precipitate. For example, when an acidic aluminum salt such as aluminum sulfate is employed as the aluminum salt, a basic substance such as sodium aluminate, potassium aluminate, sodium hydroxide or ammonia is used as the neutralizer. On the other hand, when a basic aluminum salt such as sodium aluminate is employed as the aluminum salt, an acidic substance such as aluminum sulfate, aluminum nitrate, aluminum chloride, sulfuric acid, hydrochloric acid or acetic acid is used as the neutralizer.

In the present invention, it is preferred to employ an aqueous solution containing the above neutralizer dissolved in an amount such that it reacts with the aluminum salt to thereby form alumina hydrate in a concentration of 1 to 10% by weight in terms of $Al_2O_3$.

In the process for producing alumina according to the present invention, the aqueous solution of aluminum salt and the aqueous solution of neutralizer are, for example, continuously and simultaneously added to the aqueous slurry containing a seed alumina hydrate while it is being circulated outside, i.e., outside the vessel and instantaneously uniformly mixed together to thereby obtain a mix slurry of 6 to 11 in pH. That is, the additions of the aqueous solution of aluminum salt and the aqueous solution of neutralizer to the aqueous slurry containing the seed alumina hydrate and mixing therewith are performed outside the vessel accommodating the aqueous slurry therein. A pH of the mix slurry is adjusted to a given value in the range of 6 to 11, depending on the properties of obtained alumina. When the pH of the mix slurry is lower than 6, the growth of alumina hydrate particles is difficult in the mix slurry. On the other hand, when the pH is higher than 11, the formed alumina hydrate is unfavorably redissolved in the slurry. Moreover, for forming the pseudoboehmite alumina hydrate especially preferred from the viewpoint that the objects of the present invention are attained, it is preferred that the pH of the mix slurry be adjusted to 6.0–11.0, especially 6.5–10.5 and still especially 7.0–10.0.

In the present invention, it is preferred that the amount of seed alumina hydrate (meaning the amount of seed alumina hydrate initially added in the production of alumina) range from 1 to 30% by weight, especially, from 5 to 15% by weight in terms of $Al_2O_3$ of the total of the finally obtained alumina hydrate. When the amount of seed alumina hydrate is smaller than 1% by weight, new seed alumina hydrate is generated in the aqueous slurry in the alumina production on an industrial scale, so that it is difficult to cause the seed alumina hydrate in the aqueous slurry to undergo uniform particle growth. On the other hand, when the amount of seed alumina hydrate is greater than 30% by weight, the difference in properties is slight between the seed alumina hydrate and the obtained alumina product. Moreover, it is preferred that the aluminum salt and the neutralizer be continuously mixed together so that the alumina hydrate is newly formed from the aluminum salt and the neutralizer at a rate of 0.1 to 10 times the weight of seed alumina hydrate initially added in the production of alumina in terms of $Al_2O_3$ per hour. When the rate of the new formation of alumina hydrate is lower than 0.1 times the weight of seed alumina hydrate per hour, economic alumina production cannot be performed on an industrial scale. On the other hand, when the rate is greater than 10 times the weight of seed alumina hydrate per hour, new seed is generated in the aqueous slurry, so that it is difficult to cause the seed alumina hydrate in the aqueous slurry to undergo uniform particle growth.

In the present invention, although the temperature of the aqueous slurry containing the seed alumina hydrate, with which the aqueous solution of aluminum salt and the aqueous solution of neutralizer are mixed, is not particularly limited, it is preferred that the temperature be at least 30° C., especially, at least 50° C. and, still especially, in the range of 60° to 100° C. from the viewpoint of the rate of seed alumina hydrate particle growth in the aqueous slurry.

Further, in the present invention, either at least one element selected from the elements of Groups IIA, IIIA, IVA, VA, VIA, VIII, IIIB (excluding Al) and IVB of the periodic table may be dissolved in at least one of the aqueous solution of the aluminum salt and the aqueous solution of the neutralizer, or an aqueous solution of said at least one element may be mixed with the aqueous slurry containing the seed alumina hydrate together with the aqueous solution of the aluminum salt and the aqueous solution of the neutralizer. However, the content of the above element is preferred to be less than 50% by weight, especially, from 0.5 to 30% by weight and, still especially, from 5 to 20% by weight in terms of oxide provided that the total solid content is 100% by weight. When the content of the above element is 50% by weight or more, the product particles would unfavorably lose the properties of alumina.

Examples of the above elements include Mg, Ca, Sr, rare earth elements such as Sc, Y, La, Ce, Pr and Nd, Ti, Zr, Hf, V, Nb, Cr, Mo, W, Mn, Re, Fe, Co, Ni, Rh, Pd, Pt, B, Ga, In, Si, Ge, Sn, P and Sb.

When the above element is Si, silica-containing alumina particles are produced by the process of the present invention, for example, by mixing together an aqueous solution of silicic acid and an aqueous solution of aluminum sulfate and adding the mixture to an aqueous slurry containing a seed alumina hydrate.

In the present invention, the seed alumina hydrate may be contained in at least one of the aqueous solution of aluminum salt and the aqueous solution of neutralizer. That is, an aqueous slurry (a) containing a seed alumina hydrate and an aluminum salt may be substituted for the above aqueous solution of aluminum salt, and an aqueous slurry (b) containing a seed alumina hydrate and a neutralizer may be substituted for the above aqueous solution of neutralizer.

In the above process for producing porous alumina particles with the use of the aqueous slurry (a) and the aqueous slurry (b), illustratively, an aqueous slurry containing a seed alumina hydrate is circulated and divided into two parts while being circulated, and an aluminum salt is added to one to thereby form the aqueous slurry (a) and a neutralizer to the other to thereby form the aqueous slurry (b). In the production of porous alumina particles according to this process, it is preferred that the aqueous slurry containing the seed alumina hydrate be held at a pH value of 6 to 11 and at a temperature of 30° C. or higher.

In the use of the aqueous slurry (a) containing a seed alumina hydrate and an aluminum salt in place of the aqueous solution of aluminum salt and in the use of the aqueous slurry (b) containing a seed alumina hydrate and a neutralizer in place of the aqueous solution of neutralizer, the objects of the present invention can be attained by executing the alumina production in batches without circulating the aqueous slurry containing the seed alumina hydrate.

(b) Apparatus for producing alumina

An apparatus for producing alumina according to the present invention will be described in detail below with reference to the drawings.

Figure 1:
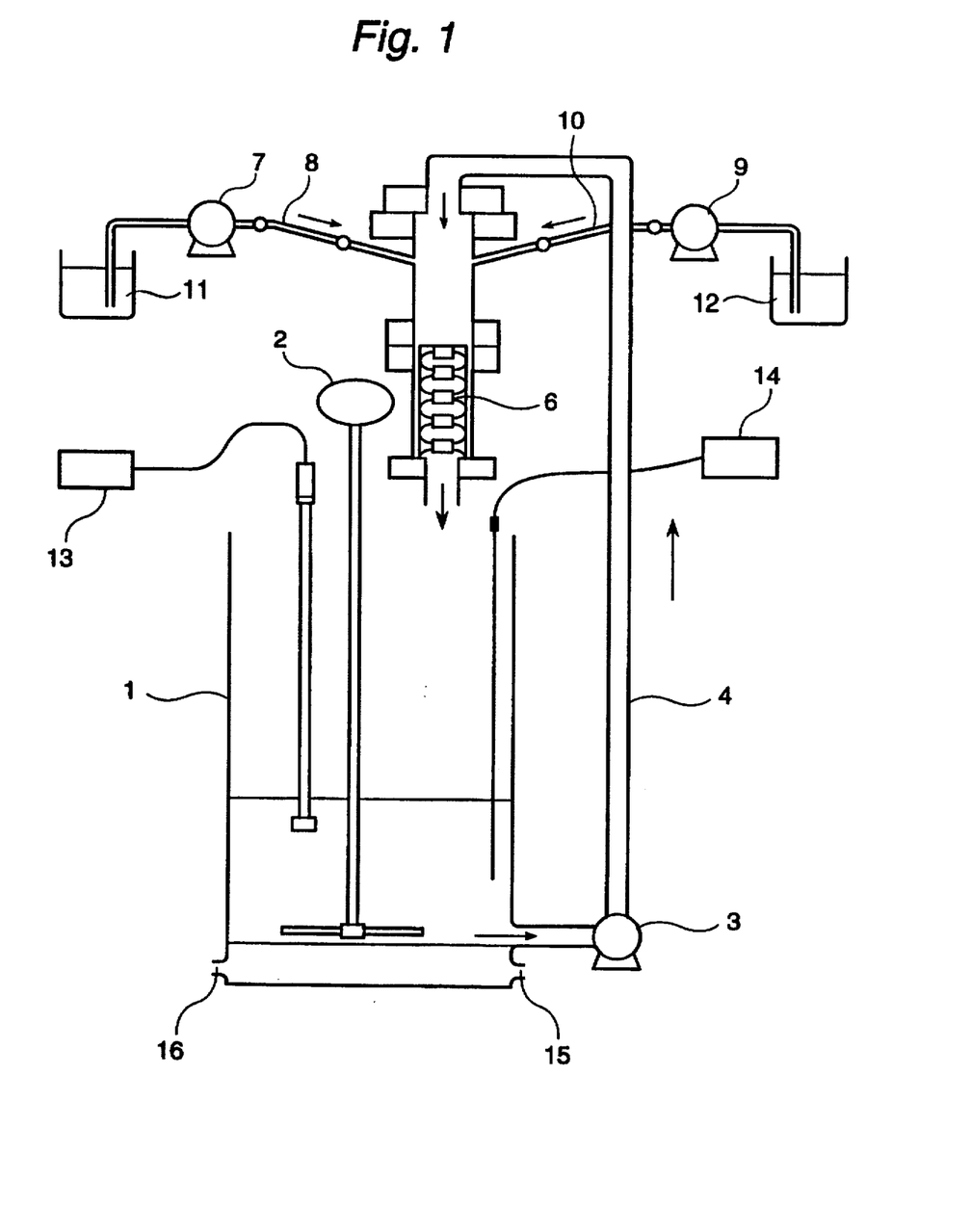
FIG. 1 is a schematic diagram showing one form of apparatus for producing alumina according to the present invention.

FIG. 1 shows one form of the apparatus for producing alumina according to the present invention.

This apparatus for producing alumina includes a tank 1 equipped with a heater as a vessel. A given amount of an aqueous slurry is put in the tank 1.

At the start of the production of the porous alumina, generally, use is made of an aqueous slurry containing a seed alumina hydrate prepared in advance according to the conventional method. However, the mixing of the aqueous solution of aluminum salt with the aqueous solution of neutralizer causes the aluminum salt and the neutralizer to react with each other to thereby form a seed alumina hydrate with the result that an aqueous slurry containing the seed alumina hydrate is fed. Therefore, a given amount of water may be used in place of the aqueous slurry.

The tank 1 is equipped with an agitator 2. The aqueous slurry put in the tank 1 is controlled to a given concentration and a given pH value within the range of 6 to 11 in the state of having been agitated by the agitator 2 and is held at a given temperature by heating.

Referring to FIG. 1, the apparatus for producing alumina is provided with a mixer 6 as a mixing device and further a circulation device composed of a pump 3 and a circulation line 4, arranged outside the tank 1. One end of the circulation line 4 is connected in communicating relationship to the tank 1. The circulation line 4 is fitted on its path with the mixer 6, so that the aqueous slurry is circulated by means of the pump 3 so as to be led out of the tank 1, pass through the circulation line 4 and the mixer 6 and return to the tank 1. That is, the mixer 6 is provided at an aqueous slurry flowback zone of the circulation line 4.

At upstream parts of the mixer 6, a first liquid addition device composed of a pump 7 and a line 8 is arranged and further a second Liquid addition device composed of a pump 9 and a line 10 is arranged. A separately prepared aqueous solution of an aluminum salt is caused to pass through the line 8 and added to the aqueous slurry being circulated by means of the pump 7. Similarly, a separately prepared aqueous solution of a neutralizer is caused to pass through the line 10 and added to the aqueous slurry being circulated by means of the pump 9.

The aqueous slurry having the aqueous solution of aluminum salt and the aqueous solution of neutralizer thus added thereto is mixed together by means of the mixer 6, adjusted to a given pH value within the range of 6 to 11 and returned to the tank 1. The mixer 6 is preferred to be capable of instantaneously uniformly mixing the mix slurry after the addition of the aqueous solution of aluminum salt and the aqueous solution of neutralizer to the aqueous slurry. Conventional liquid mixers such as a static mixer can be used as the mixer 6.

An alumina hydrate having undergone uniform particle growth to a desired size is obtained by recirculating the alumina hydrate slurry returned to the tank 1 to thereby repeat the above operations.

One form of the apparatus for producing alumina according to the present invention is as described above. However, when the reaction, between the aluminum salt added through the line 8 to the aqueous slurry being circulated and the neutralizer added through the line 10 to the aqueous slurry being circulated, advances at ordinary temperature, it is not needed to provide the tank 1 with a heater.

Figure 2:
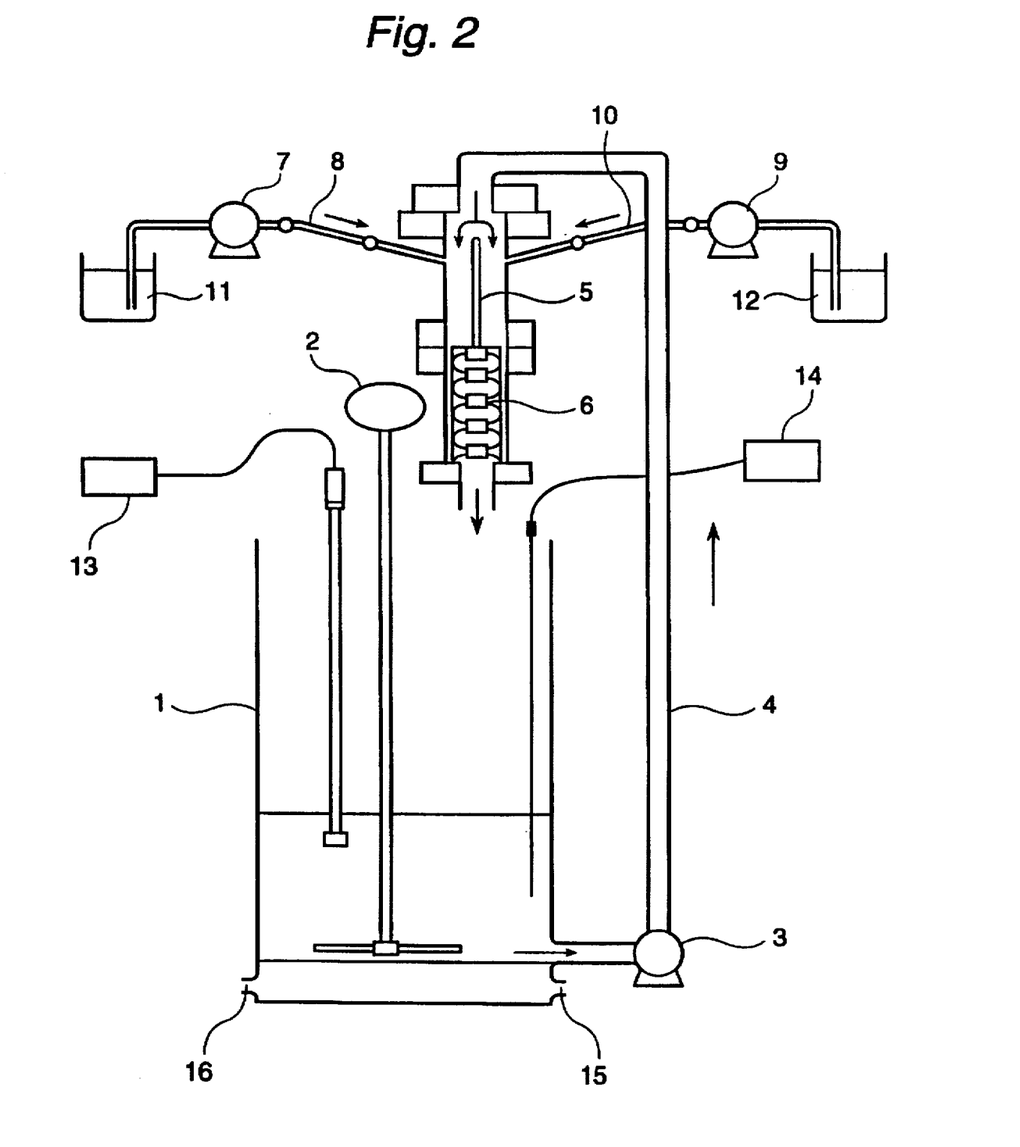
FIG. 2 is a schematic diagram showing another form of apparatus for producing alumina according to the present invention.

Another form of the apparatus for producing alumina according to the present invention is as shown in FIG. 2.

This apparatus for producing alumina has a separator 5 arranged inside the circulation line 4 positioned upstream of the mixer 6. The separator 5 is adapted to divide the flow of the aqueous slurry to the mixer 6 and to block the mixing of the aqueous solution of aluminum salt added from the line 8 with the aqueous solution of neutralizer added from the line 10. The addition of an aluminum salt to one divided part of the aqueous slurry forms an aqueous slurry (a) containing a seed alumina hydrate and an aluminum salt, and the addition of a neutralizer to the other part of the aqueous slurry forms an aqueous slurry (b) containing a seed alumina hydrate and a neutralizer.

Thus, various modifications can be effected to the apparatus for producing alumina according to the present invention within the purview of the claims.

A desired porous alumina is obtained by washing the alumina hydrate obtained with the use of the above apparatus for producing alumina by the process for producing alumina according to the present invention to thereby remove impurities, molding the washed alumina hydrate into a desired shape, drying and conducting customary treatment, for example, calcining at 300° to 1000° C.

The thus obtained porous alumina finds applications in industrial fields where the conventional porous alumina has been used, for example, various catalyst supports, adsorbents and drying agents.

The present invention enables controlling the pore characteristics of alumina and thus enables obtaining a porous alumina which ensures large pore volume and pore size and high mechanical strength. This porous alumina is especially suitable for use as a support for hydrotreating catalyst.

The hydrotreating catalyst: comprising the alumina obtained by the present invent-on and, supported thereby, 5 to 25% by weight in terms of oxide of a metal of Group VIA of the periodic table and 1 to 8% by weight in terms of oxide of a metal of Group VIII of the periodic table has high mechanical strength and exhibits high desulfurization activity.

EXAMPLES

The present invention will further be illustrated with reference to the following Examples.

COMPARATIVE EXAMPLE 1

80 kg of an aqueous solution of sodium aluminate containing 5.0% by weight of alumina was charged into a 200-liter stainless steel tank and heated at 40° C. 480 g of 50% by weight aqueous solution of sodium gluconate was added while maintaining the temperature of the sodium aluminate solution at 40° C. under high-speed agitation. Thereafter, 94 kg of an aqueous solution of aluminum sulfate containing 2.5% by weight of alumina heated at 40° C. was added over a period of about 5 min, thereby obtaining a pH 7.0 slurry of alumina hydrate (X).

This slurry of alumina hydrate (X) was held at 40° C. for 1 hr and washed to thereby obtain an alumina hydrate slurry freed of sodium and sulfate ions.

Deionized water was added to the alumina hydrate slurry to thereby obtain a slurry having an $Al_2O_3$ concentration of 10% by weight. This slurry had its pH value adjusted to 10.5 with 15% by weight aqueous ammonia solution and was aged at 95° C. for 5 hr in an aging tank equipped with a reflux condenser.

After the completion of the aging, the slurry was subjected to evaporation concentration by means of a double arm kneader equipped with a steam jacket to thereby obtain a plastic kneading product.

This kneading product was extrusion molded by means of an auger extruder into 1.9 mm cylinders. The obtained alumina molding was dried at 110° C. for 16 hr and calcined at 550° C. for 3 hr, thereby obtaining alumina support A. The various properties of the alumina support A were measured. The results are given in Table 1.

COMPARATIVE EXAMPLE 2

A pH 7.0 slurry of alumina hydrate (X) was prepared in the same manner as in Comparative Example 1. 100 kg of this slurry of alumina hydrate (X) was weighed out as a seed alumina hydrate, charged into a 1000-liter tank equipped with an agitator and agitated while maintaining the temperature thereof at 60° C. 5.0% by weight in terms of $Al_2O_3$ sodium aluminate solution and 2.5% by weight in terms of $Al_2O_3$ aluminum sulfate solution were added to the above seed alumina hydrate slurry from respective separate addition points at respective rates of 86 kg/hr and 94.6 kg/hr commonly over a period of 4 hr.

A pH of the obtained mix slurry was held at 7.0 to 7.5 during the above operation.

After the completion of the addition, the obtained alumina hydrate slurry was held at 60° C. for 1 hr and subjected to the same treatment as in Comparative Example 1, thereby obtaining alumina support B. The properties of the alumina support B are given in Table 1.

TABLE 1

| Exp. Ex. | Comp. Ex. 1 | Comp. Ex. 2 |
| --- | --- | --- |
| Mixer outlet slurry pH | | |
| Alumina support | A | B |
| Pore volume ml/g | 0.58 | 0.72 |
| Surface area m²/g | 263 | 248 |
| Pore distribution | | |
| ~100 Å | 0.51 | 0.30 |
| 100~200 Å | 0.06 | 0.41 |
| 200~1000 Å | 0.01 | 0.01 |
| 1000 Å~ | 0.00 | 0.00 |
| Average pore size Å | 79 | 102 |
| Crushing strength kg/mm *1 | 1.0 | 1.2 |
| Index of collision resisting strength *2 | 6.8 | 6.1 |

*1: Measured by Kiya penetrometer.
*2: Index of collision resisting strength: before measurement, the alumina support is sifted with a 710 μm-mesh sieve to thereby remove particles of not larger than 710 μm.

The resultant alumina support is caused to naturally fall through a vertically set 5 m pipe from its top to its bottom so as to collide with a stainless steel plate disposed at an angle of 45°. The weight proportion (%) of particles of not larger than 710 μm generated by the collision is measured, and an index is expressed by a value of 10 times the measured weight proportion (%).

EXAMPLE 1

80 kg of an aqueous solution of sodium aluminate containing 5.0% by weight of alumina was charged into a 200-liter stainless steel tank and heated at 40° C. 480 g of 50% by weight aqueous solution of sodium gluconate was added while maintaining the temperature of the sodium aluminate solution at 40° C. under high-speed agitation. Thereafter, 94 kg of an aqueous solution of aluminum sulfate containing 2.5% by weight of alumina heated at 40° C. was added over a period of about 5 min, thereby obtaining a pH 7.0 slurry of alumina hydrate (X).

100 kg of the above slurry of alumina hydrate (X) prepared in the same manner as in Comparative Example 1 was charged as a seed into the tank of the apparatus for producing alumina as shown in FIG. 1 and agitated. The seed alumina hydrate (X) was circulated through the circulation line 4 at a flow rate of 10 m³/hr while maintaining the temperature of the slurry at 60° C. A static mixer was used as the mixer 6. From an addition points arranged at an uper part in the mixer 6, 5.0% by weight in terms of $Al_2O_3$ aqueous, sodium aluminate solution and 2.5% by weight in terms of $Al_2O_3$ aqueous aluminum sulfate solution were added to the above seed alumina hydrate slurry at respective razes of 150 kg/hr and 160 kg/hr. The mixture solution thereof was uniformly mixed with the above slurry by means of the mixer 6. A pH of the alumina hydrate slurry obtained from the above mixture was held at 7.0 to 7.5 at the outlet of the mixer 6. The resultant alumina hydrate slurry was repeatedly circulated as the seed alumina hydrate. These operations were continued for 3 hr.

The obtained alumina hydrate slurry was washed to thereby remove sodium and sulfate ions therefrom.

Thereafter, deionized water was added to the alumina hydrate slurry to thereby obtain a slurry having an $Al_2O_3$ concentration of 10% by weight. This slurry had its pH value adjusted to 10.5 with 15% by weight aqueous ammonia solution and was aged at 95° C. for 5 hr in an aging tank equipped with a reflux condenser.

After the completion of the aging, the slurry was subjected to evaporation concentration by means of a double arm kneader equipped with a steam jacket to thereby obtain a plastic kneading product.

This kneading product was extrusion molded by means of an auger extruder into 1.9 mm cylinders. The obtained alumina molding was dried at 110° C. for 16 hr and calcined at 550° C. for 3 hr, thereby obtaining alumina support M. The various properties of the alumina support M were measured. The results are given in Table 2.

Alumina supports N, O and P were obtained in the same manner as performed in the production of alumina support M, except that the flow rate of the aqueous solution of aluminum sulfate was changed so that the pH of the alumina hydrate slurry at the outlet of the mixer 6 was controlled properties thereof are given in Table 2.

TABLE 2

| Exp. Example | Ex. 1 | Ex. 1 | Ex. 1 | Ex. 1 |
|---|---|---|---|---|
| Mixer outlet slurry pH | 7.0–7.5 | 7.8–8.0 | 8.3–8.5 | 8.8–9.2 |
| Alumina support | M | N | O | P |
| Pore volume ml/g | 0.77 | 0.86 | 0.95 | 0.72 |
| Surface area m²/g | 245 | 216 | 210 | 185 |
| Pore distribution | | | | |
| ~100 Å | 0.33 | 0.16 | 0.13 | 0.08 |
| 100–200 Å | 0.43 | 0.65 | 0.60 | 0.45 |
| 200–1000 Å | 0.01 | 0.04 | 0.16 | 0.12 |
| 1000 Å~ | 0.00 | 0.01 | 0.05 | 0.07 |
| Average pore size Å | 102 | 127 | 140 | 148 |
| Crushing strength kg/mm | 1.5 | 1.6 | 1.7 | 1.6 |
| Index of collision resisting strength | 3.1 | 2.3 | 2.0 | 1.5 |

With respect to the alumina supports of the Examples, as seen from the supports M, N, O and P, the average pore size is enlarged by rendering the pH of the mix slurry high and the pore volume is maximized at a pH value of about 8.5.

Generally, an alumina support tends to have mechanical strength decreased in accordance with the increase of the pore volume thereof. However, as shown in the Table, the alumina support obtained by the present process has not only increased pore volume and average pore size but also extremely high mechanical strength.

EXAMPLE 2

The effect of the time employed to add the aluminum salt and the neutralizer was studied in the same manner as in Example 1. 100 kg of the slurry of alumina hydrate (X) prepared in the same manner as in Comparative Example 1 was weighed out as a seed alumina hydrate, which was circulated at a flow rate of 10 m³/hr while maintaining the temperature thereof at 60° C. 5.0% by weight in terms of $Al_2O_3$ aqueous solution of sodium aluminate and 2.5% by weight in terms of $Al_2O_3$ aqueous solution of aluminum sulfate were added at respective rates of 86 kg/hr and 84.6 kg/hr from an addition points arranged at an upper part in the static mixer. The mixture solution thereof was uniformly mixed with the above slurry by means of the mixer 6.

The pH of the alumina hydrate slurry obtained from the above mixture was held at 7.8 to 8.2 at the outlet of the mixer 6 during the above operation. The obtained alumina hydrate slurry was repeatedly circulated. From the slurry, 20 liters was sampled at each of 2, 3, 4 and 5 hr from the start of the addition of the aqueous solution of sodium aluminate and the aqueous solution of aluminum sulfate. Alumina supports Q, R, S and T were obtained from the slurry samples in the same manner as in Comparative Example 1. The properties thereof are given in Table 3.

TABLE 3

| Exp. Example | Ex. 2 2 hours | Ex. 2 3 hours | Ex. 2 4 hours | Ex. 2 5 hours |
|---|---|---|---|---|
| Alumina support | Q | R | S | T |
| Pore volume ml/g | 0.82 | 0.86 | 0.91 | 1.02 |
| Surface area m²/g | 242 | 221 | 215 | 210 |
| Pore distribution | | | | |
| ~100 Å | 0.30 | 0.16 | 0.27 | 0.23 |
| 100–200 Å | 0.50 | 0.65 | 0.52 | 0.54 |
| 200–1000 Å | 0.02 | 0.04 | 0.08 | 0.16 |

TABLE 3-continued

| Exp. Example | Ex. 2 2 hours | Ex. 2 3 hours | Ex. 2 4 hours | Ex. 2 5 hours |
|---|---|---|---|---|
| 1000 Å~ | 0.00 | 0.01 | 0.04 | 0.09 |
| Average pore size Å | 113 | 125 | 133 | 145 |
| Crushing strength kg/mm | 1.7 | 1.6 | 1.8 | 1.3 |
| Index of collision resisting strength | 3.1 | 2.2 | 1.8 | 1.6 |

It is apparent from the above results of Table 3 that the present invention enables controlling the pore volume and average pore size of the obtained alumina support.

Further, it is apparent that the obtained alumina support exhibits high crushing strength and high collision resisting strength, irrespective of the large pore volume and average pore size.

COMPARATIVE EXAMPLE 3

229 liters of deionized water was introduced in a 1000-liter tank equipped with an agitator. 10.9 kg of 22% by weight in terms of $Al_2O_3$ aqueous solution of sodium aluminate and 144 g of 50% by weight aqueous solution of sodium gluconate were added under agitation. While maintaining the temperature of the obtained diluted aqueous sodium aluminate solution at 60° C., a part of a mixed aqueous solution consisting of 400 kg of 3% by weight in terms of $Al_2O_3$ aqueous solution of aluminum sulfate and 14.4 kg of 5.0% by weight in terms of $SiO_2$ aqueous solution of silicic acid was added to said solution at a flow rate of 5 liters/min under agitation, thereby obtaining a pH 7.2 silica/alumina hydrate slurry.

With the use of the above silica/alumina hydrate slurry as a seed slurry, the above mixed aqueous solution consisting of the aqueous solution of aluminum sulfate and the aqueous solution of silicic acid and 6.0% by weight in terms of $Al_2O_3$ aqueous solution of sodium aluminate were simultaneously added to the above seed slurry under agitation from respective separate addition points at respective rates of about 1.75 liter/min and about 1.47 litter/min while maintaining the pH and temperature of the mix slurry at a value within the range of 7.0 to 7.3 and 60° C., respectively. The addition was executed over a period of 4 hr.

The thus obtained silica/alumina hydrate slurry was held at 60° C. for 1 hr and washed to thereby remove sodium and sulfate ions therefrom.

Thereafter, deionized water was added to the hydrate slurry to thereby obtain a slurry having a solid content of 10% by weight. This slurry had its pH value adjusted to 10.5 with 15% by weight aqueous ammonia solution and was aged at 95° C. for 5 hr in an aging tank equipped with a reflux condenser.

After the completion of the aging, the slurry was subjected to evaporation concentration by means of a double arm kneader equipped with a steam jacket to thereby obtain a plastic kneading product.

This kneading product was extrusion molded by means of an auger extruder into 1.8 mm cylinders. The obtained alumina molding was dried at 110° C. for 16 hr and calcined at 550° C. for 3 hr, thereby obtaining support U. The properties thereof are given in Table 4.

EXAMPLE 3

229 liters of deionized water heated at 60° C. was introduced in the tank 1 of the apparatus for producing alumina as shown in FIG. 1. 10.9 kg of 22% by weight in terms of $Al_2O_3$ aqueous solution of sodium aluminate and 144 g of 50% by weight aqueous solution of sodium gluconate were added under agitation. The obtained diluted aqueous aluminate solution was fed through the circulation line 4 into the mixer 6 (static mixer) at a flow rate of 10 m³/hr while maintaining the temperature of the solution at 60° C., and part of a separately prepared mixed aqueous solution consisting of 400 kg of 3% by weight in terms of $Al_2O_3$ aqueous solution of aluminum su-fate and 14.4 kg of 5.0% by weight in terms of $SiO_2$ aqueous solution of silicic acid was added at a flow rate of 5 liters/min, thereby obtaining a pH 7.2 silica/alumina hydrate slurry.

The above silica/alumina hydrate slurry was used as a seed slurry, which was circulated through the circulation line 4 at a flow rate of 10 m³/hr. The above mixed aqueous solution consisting of the aqueous solution of aluminum sulfate and the aqueous solution of silicic acid was added at an upper part of the mixer 6 at a flow rate of about 1.75 liters/min and further 6.0% by weight in terms of $Al_2O_3$ aqueous solution of sodium aluminate was added at an upper part of the mixer 6 from a separate addition port at a flow rate of about 1.47 litter/min, so that the pH of the slurry was adjusted to range from 7.0 to 7.3 at the outlet of the mixer 6. The obtained silica/alumina hydrate slurry was repeatedly circulated as a seed slurry, and the above operation was continued for 4 hr. The temperature was held at 60° C. during the above operation.

The thus obtained silica/alumina hydrate slurry was held at 60° C. for 1 hr and washed to thereby remove sodium and sulfate ions therefrom.

Thereafter, deionized water was added to the hydrate slurry to thereby obtain a slurry having a solid content of 10% by weight. This slurry had its pH value adjusted to 10.5 with 15; by weight aqueous ammonia solution and was aged at 95° C. for 5 hr in an acing tank equipped with a reflux condenser.

After the completion of the aging, the slurry was subjected to evaporation concentration by means of a double arm kneader equipped with a steam jacket to thereby obtain a plastic kneading product.

This kneading product was extrusion molded by means of an auger extruder into 1.8 mm (cylinders. The obtained alumina molding was dried at 110° C. for 16 hr and calcined at 550° C. for 3 hr, thereby obtaining support V. The properties thereof are given in Table 4.

TABLE 4

| Exp. Example | Comparative Ex. 3 | Ex. 3 |
|---|---|---|
| Silica/alumina support | U | V |
| Mix slurry pH | 7.0–7.3 | 7.0–7.3 |
| Amount of $SiO_2$ wt % | 2.3 | 2.3 |
| Pore volume ml/g | 0.68 | 0.92 |
| Surface area m²/g | 277 | 324 |
| Pore distribution | | |
| ~100 Å | 0.67 | 0.72 |
| 100–200 Å | 0.01 | 0.03 |
| 200–1000 Å | 0.00 | 0.02 |
| 1000 Å~ | 0.00 | 0.15 |
| Average pore size Å | 80 | 78 |
| Crushing strength kg/mm | 1.1 | 1.6 |
| Index of collision resisting strength | 8.5 | 1.2 |

EXAMPLE 4

Use was made of the apparatus for producing alumina as shown in FIG. 2. 100 kg of the slurry of alumina hydrate (X)

prepared in the same manner as in Comparative Example 1 was introduced as a seed into the tank of the apparatus and agitated. The slurry of seed alumina hydrate (X) was circulated through the circulation line 4 at a flow rate of 10 m³/hr while maintaining the temperature of the slurry at 60° C. A static mixer was used as the mixer 6. 5.0% by weight in terms of $Al_2O_3$ aqueous solution of sodium aluminate was added at a flow rate of 150 kg/hr from an addition point arranged at an upper part of the mixer 6 separated by the separator 5 to thereby form an aqueous slurry (a), and 2.5% by weight in terms of $Al_2O_3$ aqueous solution of aluminum sulfate was added at a flow rate of 160 kg/hr from another addition point arranged at an upper part in the other part of the mixer 6 separated by the separator 5 and to thereby form an aqueous slurry (b). Both the aqueous slurries were introduced in the mixer 6 and uniformly mixed. The pH of this obtained mix slurry was held at 7.0 to 7.5 at the outlet of the mixer 6. The obtained alumina hydrate slurry was repeatedly circulated as a seed alumina hydrate, and the above operation was continued for 3 hr.

Alumina support C was obtained from the obtained alumina hydrate slurry in the same manner as in Comparative Example 1. The properties thereof are given in Table 5.

Alumina supports D, E and F were obtained in the same manner as performed in the production of alumina support C, except that the flow rate of the aqueous solution of aluminum sulfate was changed so that he pH of the alumina hydrate slurry at the outlet of the miser 6 was controlled so as to be within the range specified in Table 5. The properties thereof are given in Table 5.

TABLE 5

| Exp. Example | Ex. 4 | Ex. 4 | Ex. 4 | Ex. 4 |
|---|---|---|---|---|
| Mixer outlet slurry pH | 7.0–7.5 | 7.8–8.2 | 8.3–8.5 | 8.8–9.2 |
| Alumina support | C | D | E | F |
| Pore volume ml/g | 0.75 | 0.88 | 0.92 | 0.78 |
| Surface area m²/g | 255 | 230 | 222 | 201 |
| Pore distribution | | | | |
| ~100 Å | 0.32 | 0.22 | 0.12 | 0.06 |
| 100–200 Å | 0.42 | 0.54 | 0.61 | 0.49 |
| 200–1000 Å | 0.01 | 0.11 | 0.17 | 0.16 |
| 1000 Å – | 0.00 | 0.01 | 0.02 | 0.07 |
| Average pore size Å | 105 | 132 | 144 | 151 |
| Crushing strength kg/mm | 1.7 | 1.8 | 1.8 | 1.6 |
| Index of collision resisting strength | 2.8 | 1.8 | 2.0 | 1.7 |

The alumina supports A and B as comparative examples exhibit small values of pore volume and average pore size and also poor mechanical strength. By contrast, the alumina supports as inventive examples, for example, alumina supports C, D, E and F have average pore sizes increased by rendering the pH of the mix slurry high and the pore volume thereof is maximized at about pH 8.5.

Generally, a mechanical strength of an alumina support tends to be deteriorated in accordance with the increase of the pore volume thereof. However, as demonstrated in the table, the alumina support obtained according to the present process exhibits extremely high mechanical strength, irrespective of the large pore volume and average pore size.

EXAMPLE 5

The effect of the time employed lo add the aluminum salt and the neutralizer was studied in the same manner as in Example 4. 100 kg of the slurry of alumina hydrate (X) prepared in the same manner as in Comparative Example 1 was weighed out as a seed alumina hydrate, which was circulated at a flow rate of 10 m³/hr while maintaining the temperature thereof at 60° C. 5.0% by weight in terms of $Al_2O_3$ aqueous solution of sodium aluminate was added at a flow rate of 86 kg/hr from an addition point arranged at the upper part of the mixer 6 separated by the separator 5 to thereby form an aqueous slurry (a), and 2.5% by weight in terms of $Al_2O_3$ aqueous solution of aluminum sulfate was added at a flow rate of 84.6 kg/hr from another addition point arranged at an upper part in the other part of the mixer 6 separated by the separator 5 to thereby form an aqueous slurry (b). Both the aqueous slurries were introduced in the mixer 6 and uniformly mixed. During the above operation, the pH of the alumina hydrate slurry was held at 7.8 to 8.2 at the outlet of the mixer. The obtained alumina hydrate slurry was repeatedly circulated. From the slurry, 20 liters was sampled at each of 2, 3, 4 and 5 hr from the start of the addition of the aqueous solution of sodium aluminate and the aqueous solution of aluminum sulfite. Alumina supports G, H, I and J were obtained from the slurry samples in the same manner as in Comparative Example 1. The properties thereof are given in Table 6.

TABLE 6

| Exp. Example | Ex. 5 2 hours | Ex. 5 3 hours | Ex. 5 4 hours | Ex. 5 5 hours |
|---|---|---|---|---|
| Alumina support | G | H | I | J |
| Pore volume ml/g | 0.81 | 0.85 | 0.90 | 1.00 |
| Surface area m²/g | 245 | 233 | 231 | 214 |
| Pore distribution | | | | |
| ~100 Å | 0.23 | 0.25 | 0.25 | 0.25 |
| 100–200 Å | 0.49 | 0.52 | 0.57 | 0.58 |
| 200–1000 Å | 0.04 | 0.08 | 0.07 | 0.06 |
| 1000 Å– | 0.00 | 0.00 | 0.01 | 0.11 |
| Average pore size Å | 115 | 127 | 136 | 148 |
| Crushing strength kg/mm | 1.6 | 1.8 | 1.9 | 1.4 |
| Index of collision resisting strength | 2.8 | 2.1 | 1.8 | 1.7 |

It is apparent from the above results of Table 6 that the pore volume and average pore size are enlarged as the time is prolonged and that the mechanical strength of each alumina support is excellent.

EXAMPLE 6

Alumina supports K and L were obtained under the same conditions as employed in Example 4 for producing the alumina support C, except that the mixing temperatures were changed to 70° and 80° C., respectively. The results are given in Table 7.

TABLE 7

| Exp. Example | Ex. 4 | Ex. 6 | Ex. 6 |
|---|---|---|---|
| Mixing temperature °C. | 60 | 70 | 80 |
| Alumina support | C | K | L |
| Pore volume ml/g | 0.75 | 0.85 | 1.02 |
| Surface area m²/g | 255 | 261 | 239 |
| Pore distribution | | | |
| ~100 Å | 0.32 | 0.25 | 0.29 |
| 100–200 Å | 0.42 | 0.57 | 0.38 |
| 200–1000 Å | 0.01 | 0.03 | 0.10 |
| 1000 Å – | 0 | 0 | 0.25 |
| Average pore size Å | 105 | 115 | 120 |

TABLE 7-continued

| Exp. Example | Ex. 4 | Ex. 6 | Ex. 6 |
|---|---|---|---|
| Crushing strength kg/mm | 1.7 | 2.1 | 1.0 |
| Index of collision resisting strength | 2.8 | 1.5 | 1.6 |

The increase of the mixing temperature enables obtaining the alumina support having large pore volume such as alumina supports K and L.

In these Examples as well, simultaneous possession of large pore volume and excellent mechanical strength was realized as by the alumina supports K and L.

EXAMPLE 7

Each of the alumina support B of Comparative Example 2 and the alumina support C of Example 4 was impregnated with aqueous ammonia solutions of ammonium paramolybdate and cobalt nitrate so that molybdenum and cobalt were contained in respective amounts of 12% by weight and 3% by weight in terms of oxide. The impregnated alumina supports were dried by means of a rotary dryer in which the temperature was raised from room temperature to 250° C. The resultant dry pellets were calcined at 550° C. for 1 hr in the air, thereby obtaining hydrodesulfurization catalysts. The catalytic properties thereof are specified in Table 8.

The hydrodesulfurization activity of each of these catalysts and a commercially available catalyst of Table 8 was measured with respect to the reaction rate constant by means of a fixed bed microreactor under the following conditions in which the reaction temperature was varied.

Reaction conditions:
amount of packed catalyst 33 g,
reaction pressure 150 kg/cm$^2$,
liquid space velocity (LHSV) 4.0 hr$^{-1}$,
hydrogen/oil ratio (H$_2$/HC) 700 Nm$^3$/KL, and
reaction temperature (T) 360°, 370°, 380° C.

Atmospheric distillation residue oil was used as a charge stock oil, which had the following properties:
specific gravity (15°/4° C.) 0.9794,
viscosity (at 50° C.) 696 cSt,
carbon residue 10.8 wt. %,
asphaltene content 6.1 wt. %,
sulfur content 4.044 wt. %,
nitrogen content 1615 ppm, and
Ni+V 71 ppm.

Figure 3:
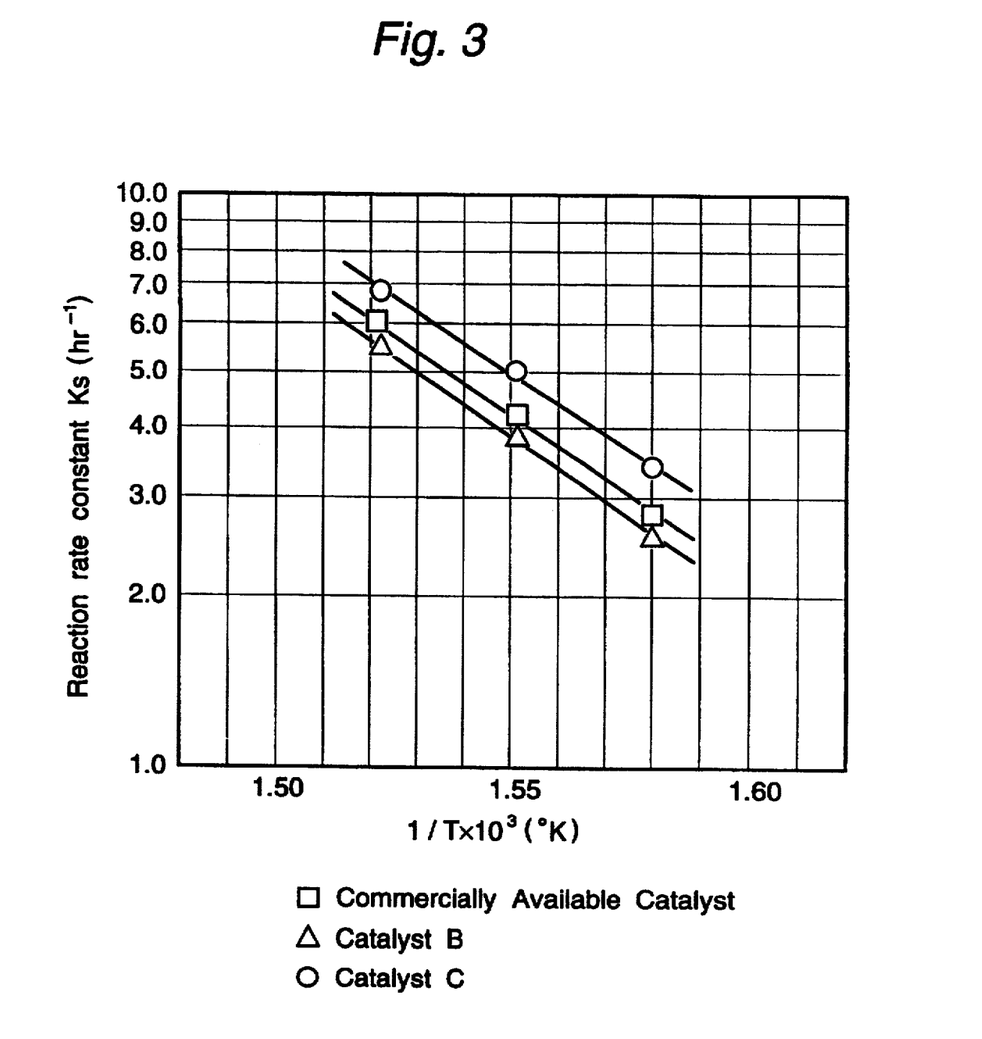

An Arrhenius plot of the reaction results is shown in FIG. 3.

It is apparent therefrom that the value of reaction rate constant Ks of the hydrotreating catalyst based on the alumina support C of the present invention is greater at each operating temperature than those of the commercially available catalyst and the comparative catalyst based on the alumina support B, thereby attesting to the superiority in desulfurization activity of the hydrotreating catalyst based on the alumina support C of the present invention. In this connection, the reaction rate constant was calculated by the formula:

$$Ks=LHSV\times(Xs/1-Xs)$$

wherein Xs=(sulfur cont. of charge stock—sulfur cont. of desulfurized oil) sulfur cont. of charge stock).

TABLE 8

| (Catalyst Properties) | Commercially available catalyst | Comp. Ex. 2 | Ex. 4 |
|---|---|---|---|
| Alumina support | | B | C |
| Catalyst properties | | | |
| Pore volume ml/g | 0.55 | 0.60 | 0.62 |
| Surface area m$^2$/g | 218 | 215 | 221 |
| Crushing strength kg/mm | 1.1 | 1.3 | 1.9 |
| Pellet diameter mm | 1.59 | 1.60 | 1.63 |
| MoO$_3$ wt/% | 12.0 | 11.8 | 11.9 |
| CoO wt/% | 3.1 | 2.9 | 2.9 |

EFFECT OF THE INVENTION

A porous alumina and a porous oxide compounds composed mainly of alumina can be produced by virtue of the present invention which enable controlling in wide ranges the pore distributions such as pore volume and pore size distributions, which ensure high productivity although the manufacturing operations are simple and which can form moldings of high mechanical strength.

Moreover, the present invention enables producing catalyst supports, especially, alumina and oxide compound supports providing excellent supports for hydrotreating catalysts.

We claim:

1. A process for producing alumina which comprises: withdrawing outside a vessel a part of a starting aqueous slurry containing a seed alumina hydrate; adding an aqueous solution of an aluminum salt and an aqueous solution of a neutralizer to the part of said aqueous slurry; mixing together the aqueous solution of the aluminum salt, the aqueous solution of the neutralizer and the part of said aqueous slurry at a pH value of 6 to 11; and returning said part of said slurry to said starting aqueous slurry to thereby cause the part of said aqueous slurry to contain newly obtained alumina hydrate prior to the return to the starting aqueous slurry.

2. The process for producing alumina as claimed in claim 1, wherein the starting aqueous slurry containing the seed alumina hydrate is held at 30° C. or higher temperatures and wherein the aqueous slurry containing the formed alumina hydrate is repeatedly circulated as the aqueous slurry containing the seed alumina hydrate.

3. The process for producing alumina as claimed in claim 1, wherein the seed alumina hydrate is initially employed in an amount of 1 to 30% by weight in terms of Al$_2$O$_3$ of the total of the finally obtained alumina hydrate.

4. The process for producing alumina as claimed in claim 1, wherein the alumina hydrate is newly formed from the aqueous solution of the aluminum salt and the aqueous solution of the neutralizer at a rate of 0.1 to 10 times the weight of the seed alumina hydrate in terms of Al$_2$O$_3$ per hour.

5. The process for producing alumina as claimed in claim 1, wherein at least one element selected from the group consisting of the elements of Groups IIA, IIIA, IVA, VA, VIA, VIII, IIIB (excluding Al) and IVB of the periodic table is dissolved in the aqueous solution of the aluminum salt and/or the aqueous solution of the neutralizer, or an aqueous solution of said at least one element is mixed with the aqueous slurry containing the seed alumina hydrate together with the aqueous solution of the aluminum salt and the aqueous solution of the neutralizer.

6. A process for producing alumina, which comprises mixing at a pH value of 6 to 11 an aqueous slurry (a) which contains a seed alumina hydrate and which has an aluminum salt dissolved therein with an aqueous slurry (b) which contains a seed alumina hydrate and which has a neutralizer dissolved therein.

7. The process for producing alumina as claimed in claim 6, wherein a starting aqueous slurry containing the seed alumina hydrate is circulated and divided into two parts while being circulated and wherein an aluminum salt is added to one of said two parts to thereby form the aqueous slurry (a) and a neutralizer is added to the other of said two parts to thereby form the aqueous slurry (b).

8. The process for producing alumina as claimed in claim 7, wherein the aqueous slurry containing the seed alumina hydrate is held at a pH value of 6 to 11 and at a temperature of 30° C. or higher.

9. An apparatus for producing alumina, which apparatus comprises: a vessel equipped with an agitator for accommodating an aqueous slurry therein; a circulating device capable of leading the aqueous slurry outside the vessel and causing the aqueous slurry to circulate and return into the vessel, said circulating device having an aqueous slurry flowback zone, said aqueous slurry flowback zone being provided with dividing means for dividing the aqueous slurry being circulated into two parts: a first liquid addition device adapted to add an aqueous solution of an aluminum salt to one of the two parts; a second liquid addition device adapted to add an aqueous solution of a neutralizer to the other of the two parts; and a mixer adapted to mix together the aqueous slurry being circulated, the aqueous solution of the aluminum salt and the aqueous solution of the neutralizer.

10. The apparatus for producing alumina as claimed in claim 9, wherein the vessel is provided with a heater for heating the aqueous slurry.

* * * * *

UNITED STATES PATENT AND TRADEMARK OFFICE
CERTIFICATE OF CORRECTION

PATENT NO. : 5,800,797
DATED : September 1, 1998
INVENTOR(S) : Wayne Langel

Page 1 of 2

It is certified that error appears in the above-identified patent and that said Letters Patent is hereby corrected as shown below:

Column 1 Line 57 "icon" should read --ion--.

Column 2 Line 14 "tie porous" should read --the porous--.

Column 6 Line 58 "second Liquid" should read --second liquid--.

Column 7 Line 53 after "catalyst" delete --:--.

Column 7 Line 54 "invent-ion" should read --invention--.

Column 9 Line 30 between "aqueous" and "sodium" delete comma --,--.

Column 9 Line 33 "razes" should read --rates--.

Column 12 Line 10 "su-fate" should read --sulfate--.

Column 12 Line 33 "15;" should read --15%--.

Column 12 Line 34 "acing tank" should read --aging tank--.

Column 12 Line 41 "1.8mm (cylinders." should read --1.8mm cylinders."--.  (delete left parenthesis)

Column 13 Line 27 "so that he" should read --so that the--.

Column 13 Line 28 "miser 6" should read --mixer 6--.

Column 13 Line 65 "lo add" should read --to add--.

Column 14 Table 6 row labeled "~100Å", under column labeled "Ex. 5, 2 hours": "0.23" should read --0.28--.

UNITED STATES PATENT AND TRADEMARK OFFICE
CERTIFICATE OF CORRECTION

PATENT NO. : 5,800,797
DATED : September 1, 1998
INVENTOR(S) : Wayne Langel

It is certified that error appears in the above-identified patent and that said Letters Patent is hereby corrected as shown below:

Column 15 Line 67 after "oil)" insert --/--.

Claim 9 Column 18 Line 7 after "parts" delete colon and insert semicolon --;--.

Signed and Sealed this

Second Day of February, 1999

Attest:

Attesting Officer

Acting Commissioner of Patents and Trademarks